US012512241B2

United States Patent
(12) United States Patent
Tsuchida et al.

(10) Patent No.: US 12,512,241 B2
(45) Date of Patent: Dec. 30, 2025

(54) DUST CORE AND ELECTRONIC DEVICE

(71) Applicant: TDK CORPORATION, Tokyo (JP)

(72) Inventors: Ayumi Tsuchida, Tokyo (JP); Ryoma Nakazawa, Tokyo (JP); Junichi Shimamura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 868 days.

(21) Appl. No.: 17/831,729

(22) Filed: Jun. 3, 2022

(65) Prior Publication Data

US 2022/0406502 A1 Dec. 22, 2022

(30) Foreign Application Priority Data

Jun. 10, 2021 (JP) ................................ 2021-097234

(51) Int. Cl.
*H01F 1/28* (2006.01)
*H01F 3/08* (2006.01)

(52) U.S. Cl.
CPC ................ *H01F 1/28* (2013.01); *H01F 3/08* (2013.01)

(58) Field of Classification Search
None
See application file for complete search history.

(56) References Cited

U.S. PATENT DOCUMENTS

2003/0229159 A1 12/2003 Akatsuka et al.
2003/0232964 A1 12/2003 Akatsuka et al.
2021/0002434 A1 1/2021 Tsuzuki et al.

FOREIGN PATENT DOCUMENTS

JP 2004-010762 A 1/2004
JP 2007-051221 A 3/2007
JP 2011-199049 A 10/2011
JP 2014-086672 A 5/2014
JP 2015-028198 A 2/2015
JP 2016-012671 A 1/2016
JP 2018-206834 A 12/2018
JP 2021-031523 A 3/2021
KR 10-2015-0005471 A 1/2015
WO 2019/193959 A1 10/2019

*Primary Examiner* — Jeffrey D Washville
(74) *Attorney, Agent, or Firm* — Oliff PLC

(57) ABSTRACT

A dust core includes magnetic particles, an epoxy resin, and an additive. The epoxy resin has at least two or more mesogenic skeletons between two epoxy bonds adjacent along a molecular chain. The additive includes one or more metallic elements selected from Li, Ba, Mg, and Ca.

7 Claims, 3 Drawing Sheets

DUST CORE AND ELECTRONIC DEVICE

The present application claims a priority on the basis of Japanese patent application No. 2021-097234 filed on Jun. 10, 2021, which is incorporated herein by reference in its entirety.

BACKGROUND

The present disclosure relates to a dust core and an electronic device including the dust core.

Dust cores used for magnetic application electronic devices, such as inductors and reactors, are generally manufactured by kneading magnetic particles together with a binder (binding material) and subjecting them to compression molding. It is known that in the dust cores, additives, such as lubricant, preservative, and dispersant, are used so as to improve characteristics, such as moldability and corrosion resistance. For example, Patent Documents 1 and 2 disclose a dust core to which a metal soap powder is added as a lubricant.

Patent Document 1: JP2011199049 (A)
Patent Document 2: JP2014086672 (A)

BRIEF SUMMARY

A dust core according to the present disclosure comprises magnetic particles, an epoxy resin, and an additive, wherein the epoxy resin has at least two or more mesogenic skeletons between two epoxy bonds adjacent along a molecular chain, and the additive includes one or more metallic elements M selected from Li, Ba, Mg, and Ca.

BRIEF DESCRIPTION OF THE DRAWING(S)

DETAILED DESCRIPTION

The additives such as the metal soap powder described in the above mentioned Patent Documents 1 and 2 are non-magnetic materials. Therefore, the addition of the above-mentioned additives to the dust core can be expected to improve the moldability and corrosion resistance, but may deteriorate magnetic characteristics, such as permeability. That is, there is a contradictory relation between the improvement effect on moldability and corrosion resistance by the additive and the magnetic characteristics of the dust core, and it is particularly difficult to achieve both high permeability and high rust resistance.

As a result of diligent studies, the inventors of the present disclosure have found that there is a peculiar relation between the number of mesogenic skeletons in the epoxy resin and the characteristics of the additive and have achieved the present disclosure.

Specifically, according to the experiments by the inventors of the present disclosure, when a resin having a mesogenic-skeleton number of 0 or 1 between epoxy bonds is used as a binder, the rust resistance may not be improved effectively even if the additive containing the metallic elements M (at least one selected from Li, Ba, Mg, and Ca) is added into the dust core. In this case, even if the rust resistance is improved by increasing the amount of the additive, the permeability is lowered, and high rust resistance and high permeability may not be achieved at the same time. On the other hand, when an epoxy resin having a mesogenic-skeleton number of two or more between epoxy bonds is used as the binder, high rust resistance and high permeability may be achieved at the same time by adding the additive containing the metallic elements M to the dust core.

Hereinafter, the present disclosure is explained based on an embodiment shown in the figures.

Figure 1:
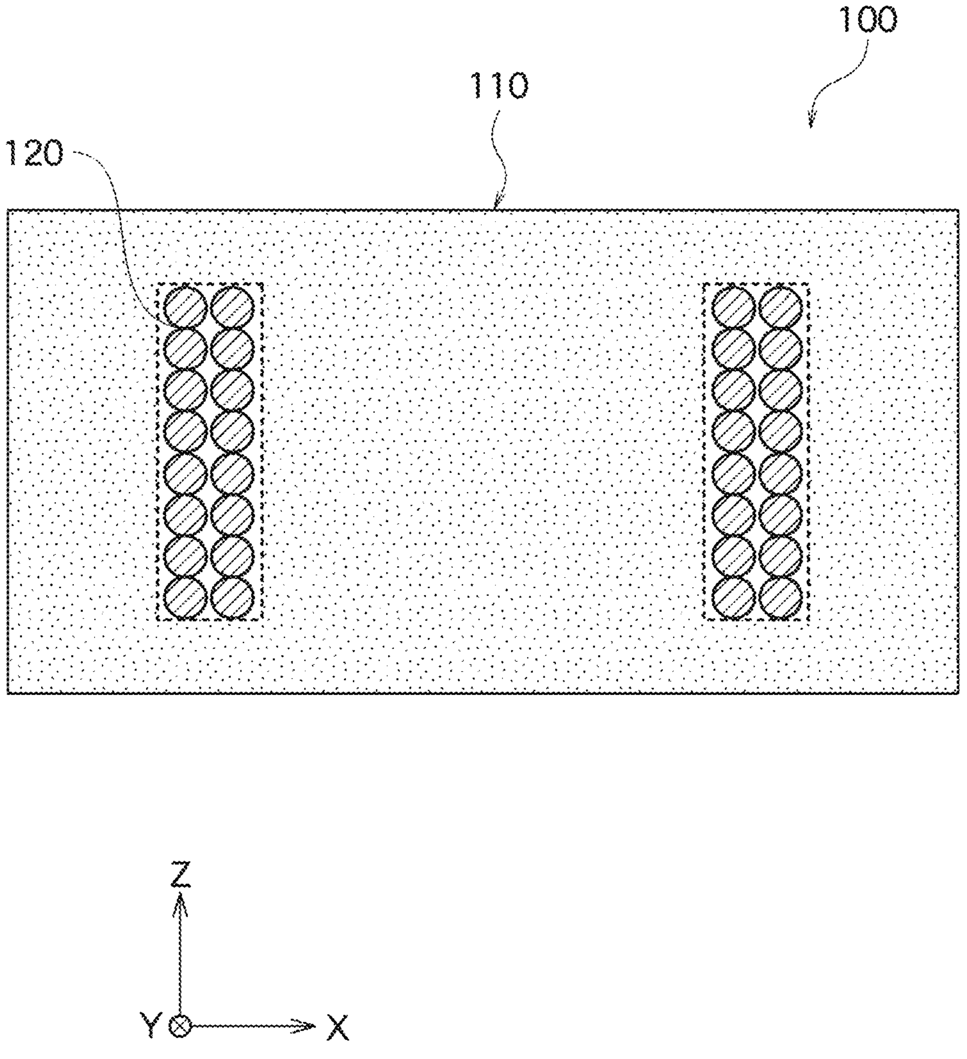
FIG. 1 is one example of a schematic cross-sectional view of an inductor element according to an embodiment of the present disclosure.

As shown in FIG. 1, an inductor element 100 according to an embodiment of the present disclosure includes a dust core 110 and a coil 120 embedded in the dust core 110.

Figure 2:
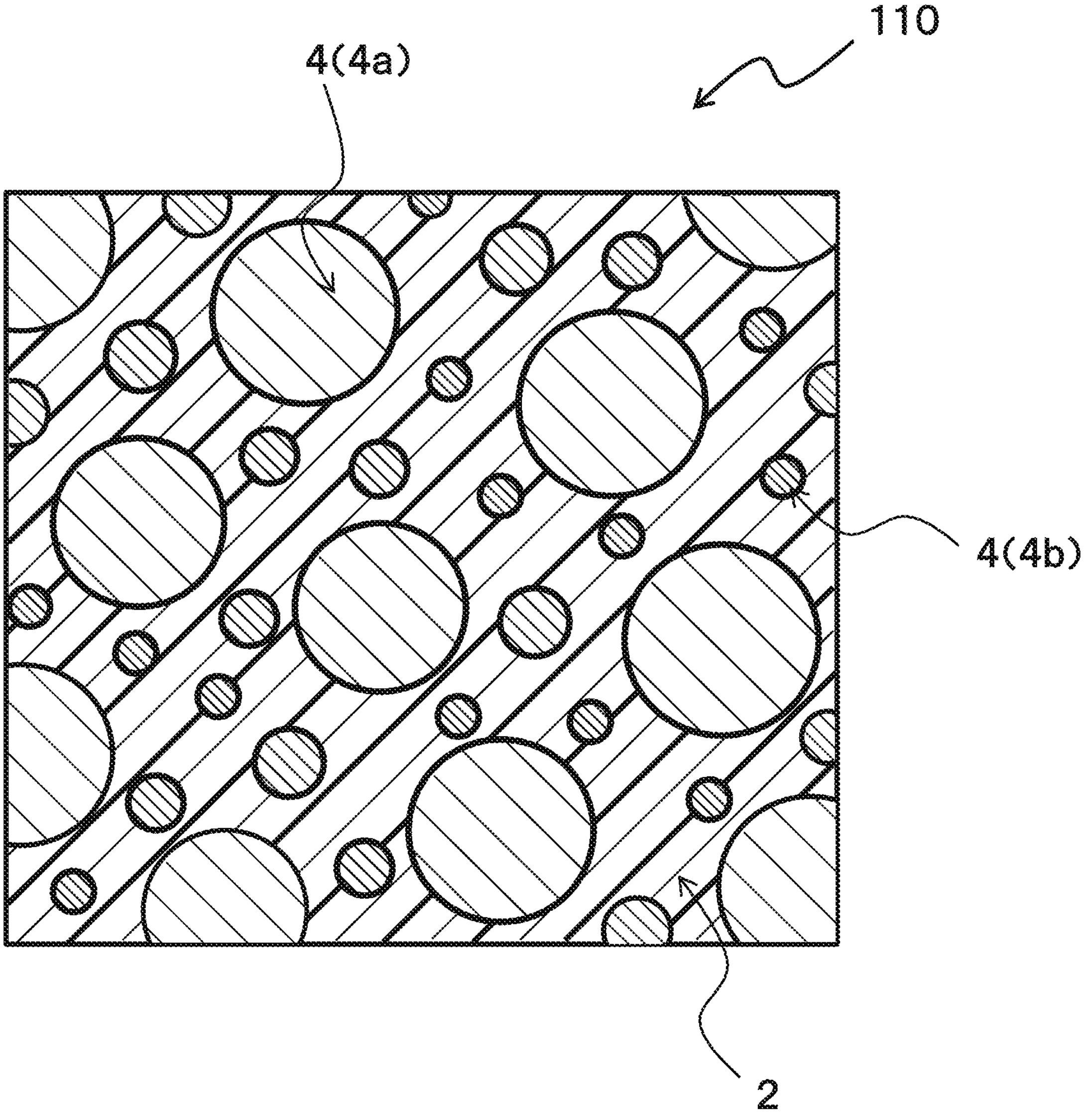
FIG. 2 is an enlarged cross-sectional view of a part of a dust core shown in FIG. 1.

The dust core 110 has any shape, such as a columnar shape, an elliptical columnar shape, and a prismatic shape. Then, as shown in FIG. 2, the dust core 110 includes a binder 2 as a binding material, magnetic particles 4 dispersed in the binder 2, and a predetermined additive 6 (not illustrated). In addition, the dust core 110 may include non-magnetic inorganic particles or the like. That is, the dust core 110 is formed into a predetermined shape by binding a plurality of magnetic particles 4 via the binder 2. Hereinafter, the binder 2, the magnetic particles 4, and the additive 6 constituting the dust core 110 are described in detail.

The binder 2 is mainly composed of cured epoxy resin and phenol resin and may contain a trace amount of organic components. Here, the "trace amount of organic component" is a component derived from a lubricant, a curing accelerator, a flexible agent, a plasticizer, a dispersant, a colorant, a settling inhibitor, etc. and may be contained in an amount of about 1.0 part by mass or less with respect to 100 parts by mass of the epoxy resin (the main component of the binder 2).

The present embodiment is characterized in that the epoxy resin of the binder 2 has a predetermined molecular structure. Specifically, the epoxy resin of the binder 2 has a plurality of mesogenic skeletons between two epoxy bonds adjacent along a molecular chain.

Here, the "epoxy bond" in the present embodiment means a molecular arrangement formed by ring-opening of an epoxy group existing in a prepolymer by a polymerization reaction (curing reaction). Moreover, the "mesogenic skeleton" is a general term for atomic groups containing polycyclic aromatic hydrocarbon or two or more aromatic rings and having rigidity and orientation.

Specifically, preferably, the mesogenic skeleton has a partial structure represented by the following formula (J).

(J)

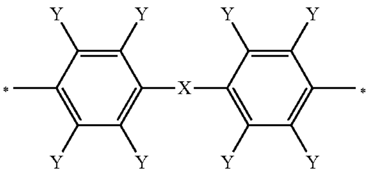

In the above-mentioned formula (J), X is a single bond or at least one linking group selected from the following group (A).

group (A)

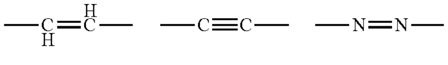

-continued

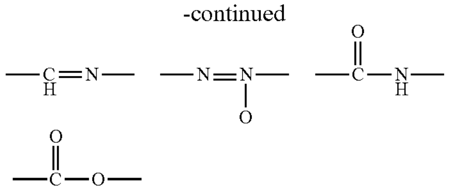

In the above-mentioned formula (J), Y is selected from —H (hydrogen), an alkyl group (an aliphatic hydrocarbon having 4 or less carbon atoms), an acetyl group, and a halogen, and Y(s) in the mesogenic skeleton may be all the same or different from each other. Moreover, * in the formula (J) represents a binding site with an adjacent atom.

In the present embodiment, more preferably, the mesogenic skeleton has a partial structure represented by the following formula (I).

(I)

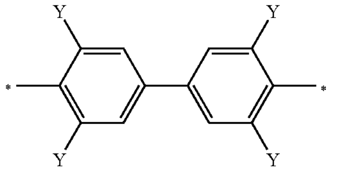

Y and * in the above-mentioned formula (I) are the same as those in the formula (J). That is, in the mesogenic skeleton shown in the formula (I), X in the formula (J) is a single bond, and the number of Y(s) on which functional groups (side chains such as alkyl group, acetyl group, and halogen) may be arranged is limited more than that in the formula (J).

The mesogenic skeleton as described above is considered to have a function of enhancing the lubricity among the magnetic particles 4 in the molding process and efficiently promoting the rearrangement of the magnetic particles 4. Moreover, stacking (molecular overlap) is likely to be formed between the mesogenic skeletons after curing, and this stacking is considered to contribute to improving the mechanical strength of the binder 2 and the dust core 110. Moreover, the mesogenic skeleton is considered to also exhibit a function of reducing the thermal resistance among the magnetic particles 4. Thus, the formation of the dust core 110 with an epoxy resin having the mesogenic skeleton is expected to improve density, strength, relative permeability, thermal conductivity, and the like. The "rearrangement of the magnetic particles 4" mentioned above means that particles move by pressurization and approach the close-packed state.

In the epoxy resin of the binder 2 in the present embodiment, at least two or more (preferably 10 or less, more preferably three or less) mesogenic skeletons as mentioned above exist between two epoxy bonds adjacent along a molecular chain. The upper limit of the mesogenic skeletons existing between the epoxy bonds is not limited and may be, for example, 100 pieces or less. The plurality of mesogenic skeletons existing between the adjacent epoxy bonds may be different from each other or may all have the same structure. Between the two adjacent epoxy bonds, the plurality of mesogenic skeletons may be connected in a single bond and exist continuously or may be connected via a single or a plurality of linking groups.

Here, "two adjacent epoxy bonds" is explained in more detail. The molecular structure having a plurality of mesogenic skeletons as mentioned above may be achieved by, for example, curing an epoxy resin having a prepolymer as shown in the following formula (K).

(K)

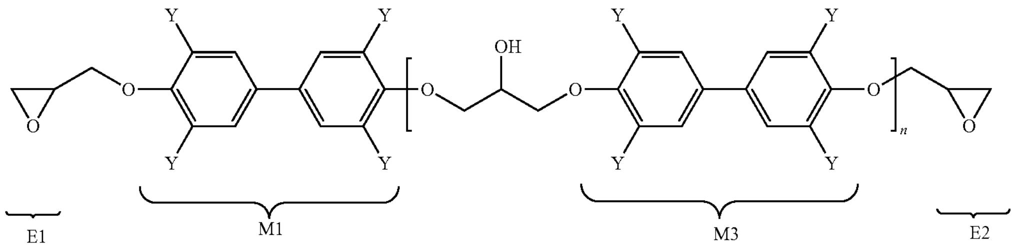

In the prepolymer represented by the formula (K), both of E1 and E2 located at the ends are epoxy groups. M1 and M3 in the formula (K) are mesogenic skeletons. When the epoxy resin containing the prepolymer of the formula (K) is cured, the epoxy groups of E1 and E2 are opened to form a polymer chain. In this case, a molecular chain between the ring-opened E1 and E2 corresponds to "between two epoxy bonds adjacent along the molecular chain", and "one (M1)+n (M3)" mesogenic skeletons exist between the epoxy bonds.

The number of mesogenic skeletons existing between the epoxy bonds may be determined by analyzing the molecular structure of the binder 2. For example, the molecular structure of the binder 2 is analyzed by appropriately concurrently using nuclear magnetic resonance spectroscopy (NMR), Fourier transform infrared spectroscopy (FT-IR), gas chromatography-mass spectrometry (GC/MS), liquid chromatography-mass spectrometry (LC/MS), time-of-flight secondary Ion mass spectrometry (TOF-SIMS), etc. A measurement sample is prepared by collecting the binder 2 from the dust core 110 shown in FIG. 1.

In the present embodiment, the magnetic particles 4 may be soft magnetic particles. The soft magnetic particles may be oxide magnetic particles such as soft ferrite, but are preferably soft magnetic metal particles containing Fe as a main component. Here, "containing Fe as a main component" means that the amount of Fe contained in the soft magnetic metal particles per unit mass is 60 wt % or more. Examples of the soft magnetic metal particles include pure iron, Fe—Si based alloy (iron-silicon), Fe—Al based alloy (iron-aluminum), permalloy based alloy (Fe—Ni), and sendust based alloy (Fe—Si—Al), Fe—Si—Cr based alloy (iron-silicon-chromium), Fe—Si—Al—Ni based alloy, Fe—Ni—Si—Co based alloy, Fe based amorphous alloy, and Fe based nanocrystalline alloy.

Preferably, the magnetic particles 4 (soft magnetic metal particles) do not substantially include a metallic element M, such as Li, Ba, Mg, and Ca, contained in the additive 6. "Not substantially include" means that the amount of the metallic element M contained in the soft magnetic metal particles per unit mass is less than 100 ppm.

Preferably, an insulating coating is formed on the surfaces of the soft magnetic metal particles as the magnetic particles 4. Examples of the insulating coating include a coating (oxide film) due to oxidation of the particle surface layer, a phosphate coating, a silicate coating, a glass coating, an inorganic coating containing BN, $SiO_2$, MgO, $Al_2O_3$, etc., and an organic coating. These insulating coatings may be formed by a surface treatment, such as heat treatment, phosphate treatment, mechanical alloying treatment, silane coupling treatment, and hydrothermal synthesis. The formation of the insulating coating on the metal magnetic particles may prevent the high frequency loss of the dust core 110.

The magnetic particles 4 have any average particle size (D50) and may have an average particle size (D50) of, for example, 50 μm or less. Preferably, the magnetic particles 4 have an average particle size (D50) of 20 μm to 40 μm. The average particle size of the magnetic particles 4 is measured by image analysis of a cross section of the dust core 110 as shown in FIG. 2. Specifically, a particle size distribution of the magnetic particles 4 is obtained by measuring an area of each particle contained in the cross section as shown in FIG. 2 and calculating a circle equivalent diameter of each particle from each area. In this measurement, the size of the measurement visual field is appropriately adjusted based on the particle sizes of the magnetic particles 4 to be observed, and the analysis is preferably performed in at least five visual fields to obtain a particle size distribution.

The magnetic particles 4 contained in the dust core 110 may all be made of the same material or may be made of a plurality of particle groups made of different materials. As shown in FIG. 2, the magnetic particles 4 may be made of a plurality of particle groups having different particle sizes. For example, the magnetic particles 4 may be formed by mixing large particles 4*a* made of a Fe—Si based alloy and small particles 4*b* made of pure iron having an average particle size smaller than that of the large particles 4*a*.

When the magnetic particles 4 are soft magnetic metal particles, the amount of the binder 2 in the dust core 110 is preferably 4.0 parts by mass or less and is more preferably 1.0 part by mass to 4.0 parts by mass, with respect to 100 parts by mass of the magnetic particles. In the dust core 110 of the present embodiment, the use of an epoxy resin having a plurality of mesogenic skeletons between epoxy bonds may maintain the shape retention and obtain a high strength even if the ratio of the binder 2 to the magnetic particles 4 is low.

The amount of the binder may be estimated by analyzing the dust core with an inductively coupled plasma emission spectrophotometer (ICP-AES). At this time, the amount of the binder is calculated by dissolving the dust core with, for example, hydrochloric acid to prepare a sample for analysis and estimating the intensity of the element detected by ICP-AES.

The additive 6 is an organometallic compound including one or more metallic elements M selected from Li, Ba, Mg, and Ca. Here, the organometallic compound is, for example, a metal alkoxide, a metal complex, a fatty acid salt, or the like and is preferably a fatty acid salt. When the additive 6 is a fatty acid salt, the fatty acid constituting the additive 6 is, for example, a stearic acid, a montanic acid, a lauric acid, a myristic acid, a ricinoleic acid, a bechenic acid, a palmitic acid, a 12-hydroxystearic acid, or the like and is preferably a stearic acid, a montanic acid, or a lauric acid.

The existence state of the additive 6 in the dust core 110 is not limited, and the additive 6 may be dispersed in the binder 2 or may be attached to the surfaces of the magnetic particles. The additive 6 functions as a lubricant in the manufacturing process of the dust core 110 and prevents molding defects. The inclusion of the additive 6 containing the metallic elements M in the dust core 110 may improve the rust resistance while preventing the decrease in the permeability.

The control of the amount of the metallic elements M in the dust core 110 within a predetermined range obtains a higher permeability and a higher corrosion resistance. Specifically, when the additive 6 contains Li, a weight ratio $R_{Li}$ of Li to a total weight (100 wt %) of the binder 2 (epoxy resin), the magnetic particles 4, and the additive 6 may be in the range of 2 ppm to 500 ppm and is preferably 10 ppm or more and 100 ppm or less.

When the additive 6 contains Ba, a weight ratio $R_{Ba}$ of Ba to a total weight of the binder 2, the magnetic particles 4, and the additive 6 may be in the range of 15 ppm to 4000 ppm and is preferably 100 ppm or more and 2000 ppm or less and more preferably 190 ppm or more and 600 ppm or less.

When the additive 6 contains Mg, a weight ratio $R_{Mg}$ of Mg to a total weight of the binder 2, the magnetic particles 4, and the additive 6 may be in the range of 4 ppm to 900 ppm and is preferably 30 ppm or more and 400 ppm or less, more preferably 30 ppm or more and 130 ppm or less, and still more preferably 40 ppm or more.

When the additive 6 contains Ca, a weight ratio $R_{ca}$ of Ca to a total weight of the binder 2, the magnetic particles 4, and the additive 6 may be in the range of 5 ppm to 1400 ppm and is preferably 50 ppm or more and 700 ppm or less and more preferably 60 ppm or more and 200 ppm or less.

The dust core 110 is formed from main constituents of the binder 2, the magnetic particles 4, and the additive 6 mentioned above. When the dust core does not contain other constituents, such as non-magnetic ceramic particles, a weight ratio $R_M$ ($R_{Li}$, $R_{Ba}$, $R_{Mg}$, and $R_{Ca}$) of the metallic elements M mentioned above corresponds to an amount of the metallic elements M in the dust core 110 per unit mass. The weight ratio $R_M$ of the metallic elements M is measured by inductively coupled plasma emission spectroscopy (ICP) after dissolving the dust core 110 with, for example, hydrochloric acid to obtain a measurement sample.

The weight ratio $R_M$ of the metallic elements M is based on the mass of the metallic elements M contained in the dust core 110 due to the additive 6. In the present embodiment, the metallic elements M are not substantially contained in the constituents other than the additive 6, such as the magnetic particles 4, and the weight ratio $R_M$ is calculated based on the mass of the metallic elements M contained in the measurement sample collected from the dust core 110. If the metallic elements M are contained in the magnetic particles 4, the weight ratio $R_M$ is calculated by analyzing the composition of the magnetic particles 4 collected from the dust core 110 with ICP, fluorescent X-ray analysis (XRF), or the like and subtracting the mass of the metallic elements M detected due to the magnetic particles 4.

The dust core 110 may contain two or more metallic elements M. That is, a plurality of additives 6 may be contained. For example, as the additive 6, lithium stearate and magnesium stearate may be added in combination.

Preferably, the dust core 110 does not substantially include other organometallic compounds excluding the metallic elements M. In particular, the dust core 110 does not substantially include the organometallic compound containing Zn. That is, preferably, the amount of Zn contained in the dust core 110 per unit mass is 50 ppm or less. When the amount of the organometallic compound containing Zn as a constituent element is within the above-mentioned range, the decrease in permeability may be prevented.

Next, one example of a method of manufacturing the inductor element 100 shown in FIG. 1 is explained.

First, a resin material (a raw material of the binder 2), a raw material powder of the magnetic particles 4, and an additive 6 are prepared. The raw material powder of the magnetic particles 4 may be produced by a known powder production method, such as gas atomizing method, water atomizing method, rotary disk method, and carbonyl method. Instead, the raw material powder may be produced by mechanically pulverizing a ribbon obtained by the single roll method. The particle sizes of the magnetic particles 4 may be controlled by performing a sieve classification, an air flow classification, or the like after obtaining the raw material powder of the magnetic particles 4 with the above-mentioned production method. When insulating coatings are formed on the surfaces of the magnetic particles 4, the raw material powder obtained above is subjected to a heat treatment or a surface treatment, such as phosphate treatment, mechanical alloying treatment, silane coupling treatment, and hydrothermal synthesis.

As the resin raw material of the binder 2, an epoxy resin made of a prepolymer before curing is prepared. This epoxy resin has at least two or more mesogenic skeletons between the two epoxy groups located at the ends of the prepolymer.

Then, the above-mentioned epoxy resin and a phenol resin (curing agent) are dissolved in a solvent to prepare a paste. At this time, it is preferable to use a curing agent having a molecular weight of about 500 to 10,000. The solvent is not limited and may be acetone, isopropyl alcohol (IPA), methyl ethyl ketone (MEK), butyl diglycol acetate (BCA), methanol, or the like. A curing accelerator (curing catalyst), a flexible agent, a plasticizer, a dispersant, a colorant, a settling inhibitor, etc. may appropriately be added to the paste. The addition amount of the curing agent is appropriately determined according to the blending amount of the epoxy resin.

As the additive 6, a powder of an organometallic compound containing the metallic elements M is prepared. The average particle size (D50) of the organometallic compound powder is preferably about 2 μm to 15 μm and is preferably smaller than the average particle size of the raw material powder of the magnetic particles 4.

Next, the raw material powder of the magnetic particles 4, the paste containing the epoxy resin, and the additive 6 are put into a kneading machine, such as a kneader and a twin-screw extruder, and kneaded to prepare a precursor for the dust core. At this time, preferably, the raw material powder and the paste are mixed so that the amount of the binder 2 is 1-4 parts by mass with respect to 100 parts by mass of the magnetic particles. Preferably, the blending ratio of the additive 6 is controlled so that the weight ratio $R_M$ of the metallic elements M in the dust core 110 is within the above-mentioned predetermined range. The additive 6 may be added to the raw material powder of the magnetic particles 4 and mixed before the kneading step. In the kneading step, non-magnetic ceramic particles or the like may be appropriately added depending on the use of the inductor element.

Next, a dust core is manufactured using the above-mentioned precursor. In the case of the inductor element 100 shown in FIG. 1, the precursor is filled in a die together with an air-core coil as an insert member and subjected to compression molding. As a result, a green compact having the shape of the dust core to be manufactured is obtained and appropriately subjected to a heat treatment so as to cure the epoxy resin in the green compact. The heat-treatment conditions at this time are not limited and are conditions under which the epoxy resin is sufficiently cured. For example, the heat-treatment temperature is 150° C. to 200° C., and the treatment time is 1 hour to 5 hours. The atmosphere during the heat treatment is not limited and may be an air atmosphere.

After the above-mentioned steps, the inductor element 100 in which the coil 120 is embedded in the dust core 110 is obtained.

SUMMARY OF PRESENT EMBODIMENT

The dust core 110 of the present embodiment includes the binder 2 containing an epoxy resin and a phenol resin, the magnetic particles 4 dispersed in the binder 2, and the additive 6. The epoxy resin contained in the binder 2 has at least two or more mesogenic skeletons between two epoxy bonds adjacent along a molecular chain. The additive 6 includes one or more metallic elements M selected from Li, Ba, Mg, and Ca.

As a result of diligent studies, the inventors of the present disclosure have found that there is a peculiar relation between the number of mesogenic skeletons in the epoxy resin and the characteristics of the additive. Specifically, according to the experiments by the inventors of the present disclosure, when a resin having a mesogenic-skeleton number of 0 or 1 between epoxy bonds is used as a binder, the rust resistance cannot be improved effectively even if the additive 6 containing the above-mentioned metallic elements M is added into the dust core. In this case, even if the rust resistance is improved by increasing the amount of the additive, the permeability is lowered, and high rust resistance and high permeability cannot be achieved at the same time. On the other hand, when an epoxy resin having a mesogenic-skeleton number of two or more between epoxy bonds is used as the binder 2, high rust resistance and high permeability can be achieved at the same time by adding the additive 6 containing the metallic elements M to the dust core 110.

In the dust core 110 of the present embodiment, a higher permeability and a higher rust resistance may be obtained by controlling the weight ratio $R_M$ of the metallic elements M to the total weight of the epoxy resin (binder 2), the magnetic particles 4, and the additive 6 within a predetermined range.

Hereinbefore, an embodiment of the present disclosure is explained, but the present disclosure is not limited to the above-mentioned embodiment and may be modified variously without departing from the gist of the present disclosure.

For example, an electronic device such as an inductor element may be configured by combining a plurality of dust cores. The dust core may have any shape, such as toroidal, FT, ET, EI, UU, EE, EER, UI, drum, pot, and cup. In the above-mentioned embodiment, the coil is embedded in the dust core, but the arrangement of the coil is not limited to the configuration shown in FIG. 1, and the coil may be formed by winding a conducting wire on the outside of the dust core.

The method of manufacturing the dust core is not limited to one in the above-mentioned embodiment, and the dust core may be manufactured by a sheet method or injection molding or may be manufactured by two-step compression. In the method by two-step compression, for example, a precursor is temporarily compressed to prepare a plurality of preliminary green compacts, and these green compacts and an air-core coil are thereafter combined and subjected to main compression.

The inductor element 100 is explained in the above-mentioned embodiment, but the dust core of the present disclosure is also applicable to electronic devices such as reactors, transformers, non-contact power feeding devices, and magnetic shield components.

EXAMPLES

Hereinafter, the present disclosure is explained in more detail based on specific examples. However, the present disclosure is not limited to the following examples.

Experiment 1

In Experiment 1, dust core samples according to Examples 1-4 and Comparative Examples 1-17 were manufactured so as to evaluate the relation between a binder and metallic elements in an additive.

Example 1

First, as a raw material powder of magnetic particles 4, an Fe—Si alloy powder having an average particle size of 25 μm was produced by a gas atomizing method. A $SiO_2$ film having an average thickness of about 100 nm was formed on the surface of the raw material powder by heat treatment.

Next, a biphenyl type epoxy resin composed of a prepolymer was prepared. The epoxy resin had three mesogenic skeletons represented by the formula (I) between epoxy groups located at the ends of a prepolymer. Then, the epoxy resin and a curing agent were dissolved in an acetone solvent to obtain a paste. At this time, the addition amount of the curing agent was 50 parts by mass with respect to 100 parts by mass of the epoxy resin, and 1 part by mass of a curing accelerator was further added with respect to 100 parts by mass of the epoxy resin.

Next, the paste and the Fe—Si alloy powder mentioned above were kneaded with a kneader to obtain a precursor for the dust core according to Example 1. At this time, lithium stearate containing Li was added as an additive 6. The blending ratio between the paste and the alloy powder was adjusted so that the amount of the binder 2 with respect to 100 parts by mass of the magnetic particles was 3 parts by mass.

Next, the precursor was put into a die and pressed at a molding pressure of 8 MPa to obtain a green compact having a toroidal shape. After the compression molding, dust cores sample according to Example 1 were obtained by heating the green compact at 180° C. for 3 hours to cure the epoxy resin in the green compact. Each of the toroidal dust core samples had about an outer diameter of 17.5 mm, an inner diameter of 10 mm, and a thickness (height) of 5 mm.

Example 2

In Example 2, barium stearate containing Ba was used as an additive 6. The experimental conditions other than the type of additive were the same as those in Example 1, and dust core samples according to Example 2 were manufactured.

Example 3

In Example 3, magnesium stearate containing Mg was used as an additive 6. The experimental conditions other than the type of additive were the same as those in Example 1, and dust core samples according to Example 3 were manufactured.

Example 4

In Example 4, calcium stearate containing Ca was used as an additive 6. The experimental conditions other than the type of additive were the same as those in Example 1, and dust core samples according to Example 4 were manufactured.

Comparative Examples 1-5

In Comparative Examples 1-5, a polyimide resin having no mesogenic skeleton was used as a binder. Then, in Comparative Examples 2-5, dust core samples were manufactured using different types of additives. Specifically, the additives according to Comparative Examples 1-5 were: no additive (Comparative Example 1), lithium stearate (Comparative Example 2), barium stearate (Comparative Example 3), magnesium stearate (Comparative Example 4), and calcium stearate (Comparative Example 5). The experimental conditions other than the above in Comparative Examples 1-5 were the same as those in Example 1.

Comparative Examples 6-10

In Comparative Examples 6-10, a cresol novolac type epoxy resin whose mesogenic-skeleton number between epoxy bonds was zero was used as a binder. Then, in Comparative Examples 7-10, dust core samples were manufactured using different types of additives. Specifically, the additives according to Comparative Examples 6-10 were: no additive (Comparative Example 6), lithium stearate (Comparative Example 7), barium stearate (Comparative Example 8), magnesium stearate (Comparative Example 9), and calcium stearate (Comparative Example 10). The experimental conditions other than the above in Comparative Examples 6-10 were the same as those in Example 1.

Comparative Examples 11-15

In Comparative Examples 11-15, a biphenyl type epoxy resin whose mesogenic-skeleton number between epoxy bonds was one was used as a binder. Then, in Comparative Examples 12-15, dust core samples were manufactured using different types of additives. Specifically, the additives according to Comparative Examples 11-15 were: no additive (Comparative Example 11), lithium stearate (Comparative Example 12), barium stearate (Comparative Example 13), magnesium stearate (Comparative Example 14), and calcium stearate (Comparative Example 15). The experimental conditions other than the above in Comparative Examples 11-15 were the same as those in Example 1.

Comparative Examples 16 and 17

In Comparative Examples 16 and 17, as with Example 1, a biphenyl type epoxy resin whose mesogenic-skeleton number between epoxy bonds was three was used. In Comparative Example 16, however, dust core samples were manufactured without using an additive 6. In Comparative Example 17, zinc stearate was added instead of the additive containing the metallic elements M. The experimental conditions other than the above in Comparative Examples 16 and 17 were the same as those in Example 1.

The following evaluations were carried out for each Example and each Comparative Example in Experiment 1.

(Measurement of Mesogenic-Skeleton Number)

An analysis sample for molecular structure analysis was collected from the manufactured dust core samples. Then, NMR, FT-IR, GC/MS, and LC/MS were performed so as to analyze the molecular structure of the binder, and the number of mesogenic skeletons existing between two adjacent epoxy bonds was determined.

(Measurement of Weight Ratio $R_M$ of Metallic Elements M)

An amount of the metallic elements M contained in the unit mass of the dust core was measured by ICP, where M was metallic elements contained in the additive used in each Example and each Comparative Example. The measured amount of the metallic elements M was a weight ratio $R_M$ of the metallic elements M contained in the total weight (100%) of the magnetic particles, the binder, and the additive.

(Measurement of Permeability)

An initial permeability μi was measured for the dust core samples of each Example and each Comparative Example. The initial permeability μi was measured by an LCR meter (HP LCR428A) after winding a conducting wire around each dust core having a toroidal shape for 30 turns.

(Evaluation of Rust Resistance)

A salt-water spray test was conducted to evaluate the rust resistance of the dust core samples. The salt-water spray test was performed in a salt-water spray tester of W900 mm, D600 mm, and H350 mm. The spray amount of salt water was 1.5±0.5 mL/hat 80 $cm^2$. The salt-water spray test was conducted at 35° C. under the conditions for 24 hours. After the salt-water spray, a measurement site of 3 mm×3 mm was randomly determined at 10 points. Each measurement site was photographed with a camera attached to an optical microscope (magnification: 50 times), and a rust area ratio of each measurement site was calculated. Then, an average rust area ratio of the 10 measurement sites was calculated. The rust resistance of the dust core sample was considered to be better as the rust area ratio was lower.

In the present examples, a case having an initial permeability μi of less than 27 and/or a rust area ratio of 20% or more was regarded as "Failure: F", a case having an initial permeability μi of 27 or more and a rust area ratio of less than 20% was regarded as "good: G", and a case having an initial permeability μi of 28.5 or more and a rust area ratio of less than 12.5% was regarded as "very good: VG". The evaluation results of each Example and each Comparative Example are shown in Table 1.

TABLE 1

| | Binder | | Additive | | Weight Ratio of Metallic | Characteristics of Dust Core | | |
|---|---|---|---|---|---|---|---|---|
| Sample No. | Type of Resin — | Number of Mesogenic Skeletons pieces | Fatty Acid — | Metallic Element M — | Element M in Dust Core ppm | Initial Permeability (μi) — | Rust Area Ratio % | Determination |
| Comp. Ex. 1 | polyimide resin | 0 | — | — | 0 | 29.76 | 30.4 | F |
| Comp. Ex. 2 | polyimide resin | 0 | stearic acid | Li | 12 | 28.41 | 28.3 | F |
| Comp. Ex. 3 | polyimide resin | 0 | stearic acid | Ba | 97 | 27.57 | 27.6 | F |
| Comp. Ex. 4 | polyimide resin | 0 | stearic acid | Mg | 20 | 27.81 | 28.1 | F |
| Comp. Ex. 5 | polyimide resin | 0 | stearic acid | Ca | 33 | 27.54 | 27.5 | F |
| Comp. Ex. 6 | epoxy resin | 0 | — | — | 0 | 30.31 | 29.8 | F |
| Comp. Ex. 7 | epoxy resin | 0 | stearic acid | Li | 12 | 28.44 | 28.0 | F |
| Comp. Ex. 8 | epoxy resin | 0 | stearic acid | Ba | 97 | 28.14 | 28.3 | F |
| Comp. Ex. 9 | epoxy resin | 0 | stearic acid | Mg | 20 | 28.82 | 27.5 | F |
| Comp. Ex. 10 | epoxy resin | 0 | stearic acid | Ca | 33 | 27.96 | 27.4 | F |
| Comp. Ex. 11 | epoxy resin | 1 | — | — | 0 | 30.37 | 28.9 | F |
| Comp. Ex. 12 | epoxy resin | 1 | stearic acid | Li | 12 | 24.37 | 7.0 | F |
| Comp. Ex. 13 | epoxy resin | 1 | stearic acid | Ba | 97 | 27.35 | 26.6 | F |
| Comp. Ex. 14 | epoxy resin | 1 | stearic acid | Mg | 20 | 27.98 | 28.5 | F |
| Comp. Ex. 15 | epoxy resin | 1 | stearic acid | Ca | 33 | 27.83 | 26.2 | F |
| Comp. Ex. 16 | epoxy resin | 3 | — | — | 0 | 29.82 | 30.5 | F |
| Comp. Ex. 17 | epoxy resin | 3 | stearic acid | Zn | 51 | 29.02 | 30.3 | F |
| Ex. 1 | epoxy resin | 3 | stearic acid | Li | 12 | 30.11 | 12.6 | G |
| Ex. 2 | epoxy resin | 3 | stearic acid | Ba | 97 | 30.31 | 15.2 | G |
| Ex. 3 | epoxy resin | 3 | stearic acid | Mg | 20 | 29.99 | 16.0 | G |
| Ex. 4 | epoxy resin | 3 | stearic acid | Ca | 33 | 30.11 | 13.6 | G |

As shown in Table 1, in Comparative Examples 1-15 (a binder having a mesogenic-skeleton number of 0 or 1 was used), the rust resistance was not sufficiently improved even if the additive containing Li, Ba, Mg, or Ca was added. Like Comparative Example 12, the rust resistance was improved in some of Comparative Examples, but the initial permeability μi decreased with the improvement in rust resistance, and high rust resistance and high permeability were not achieved at the same time.

In Comparative Example 17 (a binder having a mesogenic-skeleton number of two or more was used), an additive containing Zn was used. Even in this comparative example, high rust resistance and high permeability were not achieved at the same time. On the other hand, in Examples 1-4 (a binder having a mesogenic-skeleton number of two or more was used, and an additive containing Li, Ba, Mg, or Ca was used), the rust area ratio was lowered without reducing the initial permeability μi. This result proves that when an epoxy resin whose mesogenic-skeleton number between epoxy bonds is two or more was used as a binder, high rust resistance and high permeability can be achieved at the same time by adding an additive containing metallic element(s) selected from Li, Ba, Mg, and Ca into the dust core.

Experiment 2

Examples 5-8

In each of Examples 5-8, dust core samples were manufactured using a biphenyl type epoxy resin whose mesogenic-skeleton number between epoxy bonds was different from that in Example 1. In Examples 5-8, lithium stearate was used as an additive 6. The experimental conditions other than mesogenic-skeleton number in Examples 5-8 were the same as those in Example 1, and the same evaluations as in Example 1 were carried out.

Examples 9 and 10

In Examples 9 and 10, dust core samples were manufactured using an additive 6 whose fatty acid was different from that in Example 1. Specifically, lithium laurate was used in Example 9, and lithium montanate was used in Example 10. The experimental conditions other than the above in Examples 9 and 10 were the same as those in Example 1, and the same evaluations as in Example 1 were carried out.

The evaluation results of Experiment 2 are shown in Table 2.

TABLE 2

| | Binder | | Additive | | Weight Ratio of Metallic | Characteristics of Dust Core | | |
|---|---|---|---|---|---|---|---|---|
| Sample No. | Type of Resin — | Number of Mesogenic Skeletons pieces | Fatty Acid — | Metallic Element M — | Element M in Dust Core p p m | Initial Permeability (μi) — | Rust Area Ratio % | Determination |
| Ex. 5 | epoxy resin | 2 | stearic acid | L i | 12 | 30.15 | 12.3 | V G |
| Ex. 6 | epoxy resin | 5 | stearic acid | L i | 12 | 30.11 | 12.5 | G |
| Ex. 7 | epoxy resin | 10 | stearic acid | L i | 12 | 30.10 | 11.5 | V G |
| Ex. 8 | epoxy resin | 20 | stearic acid | L i | 12 | 30.12 | 13.0 | G |
| Ex. 9 | epoxy resin | 3 | lauric acid | L i | 306 | 29.06 | 8.1 | V G |
| Ex. 10 | epoxy resin | 3 | montanic acid | L i | 321 | 29.61 | 7.8 | V G |

As shown in Table 2, even in Examples 5-8 (the mesogenic-skeleton number was changed), the rust area ratio was reduced without lowering the initial permeability μi as in Example 1. Also in Examples 9 and 10 (the type of fatty acid was changed), the rust area ratio was reduced without lowering the initial permeability μi as in Example 1. In Experiment 2, an additive containing Li was used as a representative example, but experiments in which the mesogenic-skeleton number and the type of fatty acid were changed were also carried out in the case of using an additive containing Ba, Mg, or Ca. As a result, even in the case of Ba, Mg, or Ca, the evaluation results similar to those in the case of Li shown in Table 2 were obtained.

Experiment 3

In Experiment 3, the influence of the amount of metallic elements derived from the additive in the dust core was evaluated.

Examples 1-1 to 1-8

To evaluate the influence of the weight ratio $R_{Li}$ of Li, eight types of dust core samples (Examples 1-1 to 1-8) related to Example 1 were manufactured by changing the addition amount of lithium stearate. The experimental conditions other than the above were the same as those of Example 1 in Experiment 1. The evaluation results are shown in Table 3.

Examples 2-1 to 2-8

To evaluate the influence of the weight ratio $R_{Ba}$ of Ba, eight types of dust core samples (Examples 2-1 to 2-8) related to Example 2 were manufactured by changing the addition amount of barium stearate. The experimental conditions other than the above were the same as those of Example 2 in Experiment 1. The evaluation results are shown in Table 4.

Examples 3-1 to 3-8

To evaluate the influence of the weight ratio $R_{Mg}$ of Mg, eight types of dust core samples (Examples 3-1 to 3-8) related to Example 3 were manufactured by changing the addition amount of magnesium stearate. The experimental conditions other than the above were the same as those of Example 3 in Experiment 1. The evaluation results are shown in Table 5.

Examples 4-1 to 4-8

To evaluate the influence of the weight ratio $R_{ca}$ of Ca, eight types of dust core samples (Examples 4-1 to 4-8) related to Example 4 were manufactured by changing the addition amount of calcium stearate. The experimental conditions other than the above were the same as those of Example 4 in Experiment 1. The evaluation results are shown in Table 6.

Comparative Examples 2-1 to 2-5

Also in Comparative Example 2 (a polyimide resin was used), five types of dust core samples (Comparative Examples 2-1 to 2-5) related to Comparative Example 2 were manufactured by changing the addition amount of lithium stearate. The experimental conditions other than the above were the same as those of Comparative Example 2 in Experiment 1. The evaluation results are shown in Table 7.

Comparative Examples 4-1 to 4-5

Also in Comparative Example 4 (a polyimide resin was used), five types of dust core samples (Comparative Examples 4-1 to 4-5) related to Comparative Example 4 were manufactured by changing the addition amount of barium stearate. The experimental conditions other than the above were the same as those of Comparative Example 4 in Experiment 1. The evaluation results are shown in Table 8.

Comparative Examples 7-1 to 7-5

Also in Comparative Example 7 (a cresol novolac type epoxy resin whose mesogenic-skeleton number was zero was used), five types of dust core samples (Comparative Examples 7-1 to 7-5) related to Comparative Example 7 were manufactured by changing the addition amount of lithium stearate. The experimental conditions other than the above were the same as those of Comparative Example 7 in Experiment 1. The evaluation results are shown in Table 9.

Comparative Examples 14-1 to 14-5

Also in Comparative Example 14 (a biphenyl type epoxy resin whose mesogenic-skeleton number was one was used), five types of dust core samples (Comparative Examples 14-1 to 14-5) related to Comparative Example 14 were manufactured by changing the addition amount of magnesium stearate. The experimental conditions other than the above were the same as those of Comparative Example 14 in Experiment 1. The evaluation results are shown in Table 10.

Comparative Examples 17-1 to 17-5

Also in Comparative Example 17 (a biphenyl type epoxy resin whose mesogenic-skeleton number was three was used), five types of dust core samples (Comparative Examples 17-1 to 17-5) related to Comparative Example 17 were manufactured by changing the addition amount of zinc stearate. The experimental conditions other than the above were the same as those of Comparative Example 17 in Experiment 1. The evaluation results are shown in Table 11.

TABLE 3

| | Binder | | Additive | | Weight Ratio of Metallic | Characteristics of Dust Core | | |
|---|---|---|---|---|---|---|---|---|
| Sample No. | Type of Resin — | Number of Mesogenic Skeletons pieces | Fatty Acid — | Metallic Element M — | Element M in Dust Core p p m | Initial Permeability (μi) — | Rust Area Ratio % | Determination |
| Ex. 1-1 | epoxy resin | 3 | stearic acid | L i | 2 | 30.13 | 13.1 | G |
| Ex. 1-2 | epoxy resin | 3 | stearic acid | L i | 12 | 30.11 | 12.4 | V G |
| Ex. 1-3 | epoxy resin | 3 | stearic acid | L i | 24 | 30.10 | 9.5 | V G |
| Ex. 1-4 | epoxy resin | 3 | stearic acid | L i | 48 | 29.31 | 9.0 | V G |
| Ex. 1-5 | epoxy resin | 3 | stearic acid | L i | 72 | 28.93 | 9.5 | V G |
| Ex. 1-6 | epoxy resin | 3 | stearic acid | L i | 119 | 27.68 | 8.6 | G |
| Ex. 1-7 | epoxy resin | 3 | stearic acid | L i | 238 | 27.57 | 7.1 | G |
| Ex. 1-8 | epoxy resin | 3 | stearic acid | L i | 471 | 27.50 | 7.6 | G |

TABLE 4

| | Binder | | Additive | | Weight Ratio of Metallic | Characteristics of Dust Core | | |
|---|---|---|---|---|---|---|---|---|
| Sample No. | Type of Resin — | Number of Mesogenic Skeletons pieces | Fatty Acid — | Metallic Element M — | Element M in Dust Core p p m | Initial Permeability (μi) — | Rust Area Ratio % | Determination |
| Ex. 2-1 | epoxy resin | 3 | stearic acid | B a | 19 | 30.39 | 14.3 | G |
| Ex. 2-2 | epoxy resin | 3 | stearic acid | B a | 97 | 30.31 | 15.2 | G |
| Ex. 2-3 | epoxy resin | 3 | stearic acid | B a | 195 | 30.26 | 8.5 | V G |
| Ex. 2-4 | epoxy resin | 3 | stearic acid | B a | 389 | 29.54 | 8.0 | V G |
| Ex. 2-5 | epoxy resin | 3 | stearic acid | B a | 583 | 29.82 | 8.6 | V G |
| Ex. 2-6 | epoxy resin | 3 | stearic acid | B a | 970 | 28.47 | 8.5 | G |
| Ex. 2-7 | epoxy resin | 3 | stearic acid | B a | 1931 | 28.03 | 7.4 | G |
| Ex. 2-8 | epoxy resin | 3 | stearic acid | B a | 3824 | 27.90 | 7.0 | G |

TABLE 5

| | Binder | | Additive | | Weight Ratio of Metallic | Characteristics of Dust Core | | |
|---|---|---|---|---|---|---|---|---|
| Sample No. | Type of Resin — | Number of Mesogenic Skeletons pieces | Fatty Acid — | Metallic Element M — | Element M in Dust Core p p m | Initial Permeability (μi) — | Rust Area Ratio % | Determination |
| Ex. 3-1 | epoxy resin | 3 | stearic acid | Mg | 4 | 30.10 | 17.3 | G |
| Ex. 3-2 | epoxy resin | 3 | stearic acid | Mg | 20 | 29.99 | 16.0 | G |
| Ex. 3-3 | epoxy resin | 3 | stearic acid | Mg | 41 | 29.58 | 9.0 | V G |
| Ex. 3-4 | epoxy resin | 3 | stearic acid | Mg | 82 | 28.95 | 8.1 | V G |

TABLE 5-continued

| Sample No. | Binder: Type of Resin | Binder: Number of Mesogenic Skeletons | Additive: Fatty Acid | Additive: Metallic Element M | Weight Ratio of Metallic Element M in Dust Core | Characteristics of Dust Core: Initial Permeability (μi) | Characteristics of Dust Core: Rust Area Ratio | Determination |
|---|---|---|---|---|---|---|---|---|
| — | — | pieces | — | — | p p m | — | % | |
| Ex. 3-5 | epoxy resin | 3 | stearic acid | Mg | 123 | 28.69 | 8.5 | V G |
| Ex. 3-6 | epoxy resin | 3 | stearic acid | Mg | 204 | 28.38 | 8.6 | G |
| Ex. 3-7 | epoxy resin | 3 | stearic acid | Mg | 406 | 27.96 | 7.4 | G |
| Ex. 3-8 | epoxy resin | 3 | stearic acid | Mg | 804 | 27.89 | 7.1 | G |

TABLE 6

| Sample No. | Binder: Type of Resin | Binder: Number of Mesogenic Skeletons | Additive: Fatty Acid | Additive: Metallic Element M | Weight Ratio of Metallic Element M in Dust Core | Characteristics of Dust Core: Initial Permeability (μi) | Characteristics of Dust Core: Rust Area Ratio | Determination |
|---|---|---|---|---|---|---|---|---|
| — | — | pieces | — | — | p p m | — | % | |
| Ex. 4-1 | epoxy resin | 3 | stearic acid | C a | 7 | 30.26 | 15.0 | G |
| Ex. 4-2 | epoxy resin | 3 | stearic acid | C a | 33 | 30.11 | 13.6 | G |
| Ex. 4-3 | epoxy resin | 3 | stearic acid | C a | 66 | 29.73 | 8.3 | V G |
| Ex. 4-4 | epoxy resin | 3 | stearic acid | C a | 132 | 29.60 | 8.5 | V G |
| Ex. 4-5 | epoxy resin | 3 | stearic acid | C a | 197 | 29.51 | 7.2 | V G |
| Ex. 4-6 | epoxy resin | 3 | stearic acid | C a | 328 | 28.38 | 7.0 | G |
| Ex. 4-7 | epoxy resin | 3 | stearic acid | C a | 653 | 28.37 | 6.6 | G |
| Ex. 4-8 | epoxy resin | 3 | stearic acid | C a | 1294 | 27.99 | 7.3 | G |

TABLE 7

| Sample No. | Binder: Type of Resin | Binder: Number of Mesogenic Skeletons | Additive: Fatty Acid | Additive: Metallic Element M | Weight Ratio of Metallic Element M in Dust Core | Characteristics of Dust Core: Initial Permeability (μi) | Characteristics of Dust Core: Rust Area Ratio | Determination |
|---|---|---|---|---|---|---|---|---|
| — | — | pieces | — | — | p p m | — | % | |
| Comp. Ex. 2-1 | polyimide resin | 0 | stearic acid | L i | 12 | 28.41 | 28.3 | F |
| Comp. Ex. 2-2 | polyimide resin | 0 | stearic acid | L i | 24 | 28.33 | 26.1 | F |
| Comp. Ex. 2-3 | polyimide resin | 0 | stearic acid | L i | 72 | 27.51 | 23.6 | F |
| Comp. Ex. 2-4 | polyimide resin | 0 | stearic acid | L i | 119 | 26.64 | 19.4 | F |
| Comp. Ex. 2-5 | polyimide resin | 0 | stearic acid | L i | 238 | 25.28 | 9.6 | F |

TABLE 8

| Sample No. | Binder: Type of Resin | Binder: Number of Mesogenic Skeletons | Additive: Fatty Acid | Additive: Metallic Element M | Weight Ratio of Metallic Element M in Dust Core | Characteristics of Dust Core: Initial Permeability (μi) | Characteristics of Dust Core: Rust Area Ratio | Determination |
|---|---|---|---|---|---|---|---|---|
| — | — | pieces | — | — | p p m | — | % | |
| Comp. Ex. 4-1 | polyimide resin | 0 | stearic acid | B a | 97 | 27.57 | 27.6 | F |
| Comp. Ex. 4-2 | polyimide resin | 0 | stearic acid | B a | 195 | 27.51 | 27.3 | F |
| Comp. Ex. 4-3 | polyimide resin | 0 | stearic acid | B a | 583 | 27.03 | 24.8 | F |
| Comp. Ex. 4-4 | polyimide resin | 0 | stearic acid | B a | 970 | 26.59 | 18.0 | F |
| Comp. Ex. 4-5 | polyimide resin | 0 | stearic acid | B a | 1931 | 26.39 | 8.7 | F |

TABLE 9

| | Binder | | Additive | | Weight Ratio of Metallic | Characteristics of Dust Core | | |
|---|---|---|---|---|---|---|---|---|
| Sample No. | Type of Resin — | Number of Mesogenic Skeletons pieces | Fatty Acid — | Metallic Element M — | Element M in Dust Core p p m | Initial Permeability (μi) — | Rust Area Ratio % | Determination |
| Comp. Ex. 7-1 | epoxy resin | 0 | stearic acid | L i | 12 | 28.44 | 28.0 | F |
| Comp. Ex. 7-2 | epoxy resin | 0 | stearic acid | L i | 24 | 28.23 | 26.0 | F |
| Comp. Ex. 7-3 | epoxy resin | 0 | stearic acid | L i | 72 | 27.67 | 25.7 | F |
| Comp. Ex. 7-4 | epoxy resin | 0 | stearic acid | L i | 119 | 25.63 | 16.3 | F |
| Comp. Ex. 7-5 | epoxy resin | 0 | stearic acid | L i | 238 | 25.57 | 8.5 | F |

TABLE 10

| | Binder | | Additive | | Weight Ratio of Metallic | Characteristics of Dust Core | | |
|---|---|---|---|---|---|---|---|---|
| Sample No. | Type of Resin — | Number of Mesogenic Skeletons pieces | Fatty Acid — | Metallic Element M — | Element M in Dust Core p p m | Initial Permeability (μi) — | Rust Area Ratio % | Determination |
| Comp. Ex. 14-1 | epoxy resin | 1 | stearic acid | Mg | 20 | 27.98 | 28.5 | F |
| Comp. Ex. 14-2 | epoxy resin | 1 | stearic acid | Mg | 41 | 27.34 | 28.5 | F |
| Comp. Ex. 14-3 | epoxy resin | 1 | stearic acid | Mg | 123 | 26.66 | 25.7 | F |
| Comp. Ex. 14-4 | epoxy resin | 1 | stearic acid | Mg | 204 | 25.94 | 24.1 | F |
| Comp. Ex. 14-5 | epoxy resin | 1 | stearic acid | Mg | 406 | 25.89 | 21.4 | F |

TABLE 11

| | Binder | | Additive | | Weight Ratio of Metallic | Characteristics of Dust Core | | |
|---|---|---|---|---|---|---|---|---|
| Sample No. | Type of Resin — | Number of Mesogenic Skeletons pieces | Fatty Acid — | Metallic Element M — | Element M in Dust Core p p m | Initial Permeability (μi) — | Rust Area Ratio % | Determination |
| Comp. Ex. 17-1 | epoxy resin | 3 | stearic acid | Z n | 51 | 29.02 | 30.3 | F |
| Comp. Ex. 17-2 | epoxy resin | 3 | stearic acid | Z n | 102 | 28.56 | 29.7 | F |
| Comp. Ex. 17-3 | epoxy resin | 3 | stearic acid | Z n | 307 | 25.93 | 15.2 | F |
| Comp. Ex. 17-4 | epoxy resin | 3 | stearic acid | Z n | 510 | 25.78 | 12.5 | F |
| Comp. Ex. 17-5 | epoxy resin | 3 | stearic acid | Z n | 1016 | 25.35 | 11.9 | F |

Figure 3:
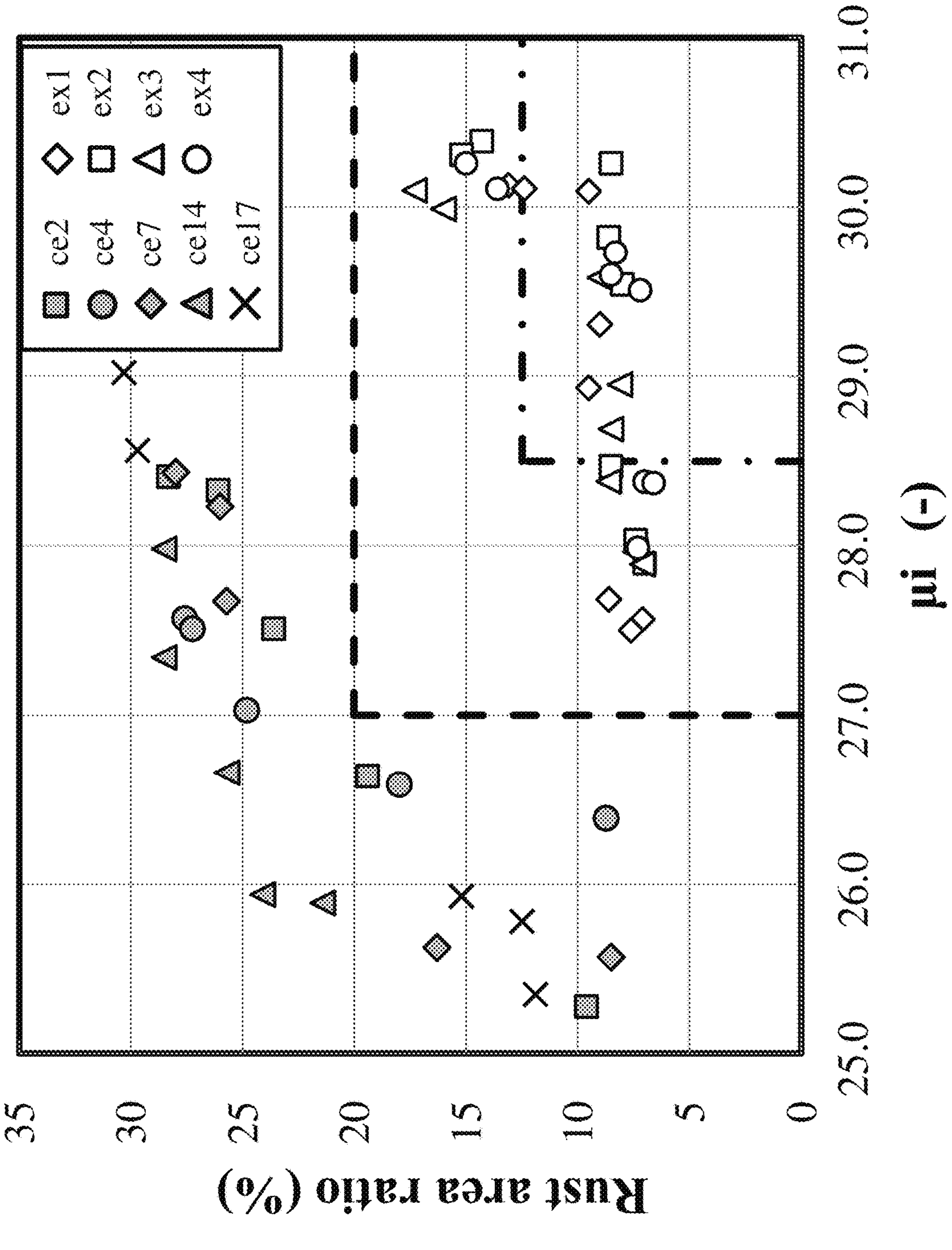
FIG. 3 is a graph summarizing evaluation results of Examples shown in Table 3 to Table 11.

The evaluation results shown in Tables 3-11 are summarized in the graph of FIG. 3. In the graph of FIG. 3, the measurement results of Tables 3-11 are plotted with the horizontal axis (initial permeability μi) and the vertical axis (rust area ratio). In the graph of FIG. 3, the closer the plot is to the lower right side of the graph, the higher the permeability is, and the better the rust resistance is. The range surrounded by broken line is good, and the range surrounded by one dot chain line is very good.

As shown in Tables 3-11 and FIG. 3, in Comparative Examples 2, 4, 7, 14, and 17, when the addition amount of the fatty acid salt (additive) was increased, the rust area ratio tended to decrease, but the initial permeability also decreased. That is, when a resin having a mesogenic-skeleton number of 0 or 1 was used, it was difficult to achieve high rust resistance and high rust resistance at the same time even though the addition amount of the fatty acid salt containing the metallic elements M (Li, Ba, Mg, or Ca) was adjusted. On the other hand, in Examples 1-4 (an epoxy resin having a mesogenic-skeleton number of two or more was used), a higher rust resistance and a higher permeability were obtained by adjusting the weight ratio $R_M$ of the metallic elements M contained in the dust core.

Specifically, the results shown in Table 3 indicate that the weight ratio $R_{Li}$ of Li contained in the dust core was preferably 10 ppm to 100 ppm. The results shown in Table 4 indicate that the weight ratio $R_{Ba}$ of Ba contained in the dust core was preferably 190 ppm to 600 ppm. The results shown in Table 5 indicate that the weight ratio $R_{Mg}$ of Mg contained in the dust core was preferably 30 ppm to 130 ppm. The results shown in Table 6 indicate that the weight ratio $R_{ca}$ of Ca contained in the dust core was preferably 60 ppm to 200 ppm.

SUPPLEMENTARY NOTES

A part or all of the above-mentioned embodiment and examples may be described as the following supplementary notes, but are not limited thereto.

Supplementary Note 1

A dust core comprising magnetic particles, an epoxy resin, and an additive, wherein the epoxy resin has at least two or more mesogenic skeletons between two epoxy bonds adjacent along a molecular chain, and the additive includes one or more metallic elements selected from Li, Ba, Mg, and Ca.

Supplementary Note 2

The dust core according to supplementary note 1, wherein the additive includes Li, and a weight ratio of Li to a total weight of the magnetic particles, the epoxy resin, and the additive is 10 ppm or more and 100 ppm or less.

Supplementary Note 3

The dust core according to supplementary note 1, wherein the additive includes Ba, and a weight ratio of Ba to a total weight of the magnetic particles, the epoxy resin, and the additive is 190 ppm or more and 600 ppm or less.

Supplementary Note 4

The dust core according to supplementary note 1, wherein the additive includes Mg, and a weight ratio of Mg to a total weight of the magnetic particles, the epoxy resin, and the additive is 30 ppm or more and 130 ppm or less.

Supplementary Note 5

The dust core according to supplementary note 1, wherein the additive includes Ca, and a weight ratio of Ca to a total weight of the magnetic particles, the epoxy resin, and the additive is 60 ppm or more and 200 ppm or less.

Supplementary Note 6

The dust core according to any of supplementary notes 1 to 5, wherein the magnetic particles comprise soft magnetic metal particles each including Fe as a main component.

Supplementary Note 7

An electronic device comprising the dust core according to any of supplementary notes 1 to 6.

DESCRIPTION OF THE REFERENCE NUMERICAL

100 . . . inductor element
110 . . . dust core
2 . . . binder
4 . . . magnetic particle
4*a* . . . large particle
4*b* . . . small particle
120 . . . coil

What is claimed is:

1. A dust core comprising magnetic particles, an epoxy resin, and an additive, wherein the epoxy resin has at least two or more mesogenic skeletons between two epoxy bonds adjacent along a molecular chain, and the additive includes one or more metallic elements selected from Li, Ba, Mg, and Ca.

2. The dust core according to claim 1, wherein the additive includes Li, and a weight ratio of Li to a total weight of the magnetic particles, the epoxy resin, and the additive is 10 ppm or more and 100 ppm or less.

3. The dust core according to claim 1, wherein the additive includes Ba, and a weight ratio of Ba to a total weight of the magnetic particles, the epoxy resin, and the additive is 190 ppm or more and 600 ppm or less.

4. The dust core according to claim 1, wherein the additive includes Mg, and a weight ratio of Mg to a total weight of the magnetic particles, the epoxy resin, and the additive is 30 ppm or more and 130 ppm or less.

5. The dust core according to claim 1, wherein the additive includes Ca, and a weight ratio of Ca to a total weight of the magnetic particles, the epoxy resin, and the additive is 60 ppm or more and 200 ppm or less.

6. The dust core according to claim 1, wherein the magnetic particles comprise soft magnetic metal particles each including Fe as a main component.

7. An electronic device comprising the dust core according to claim 1.

* * * * *